Dec. 10, 1929.  J. O. BAILEY  1,739,345
LUBRICATING CONVEYER HANGER
Filed March 29, 1928
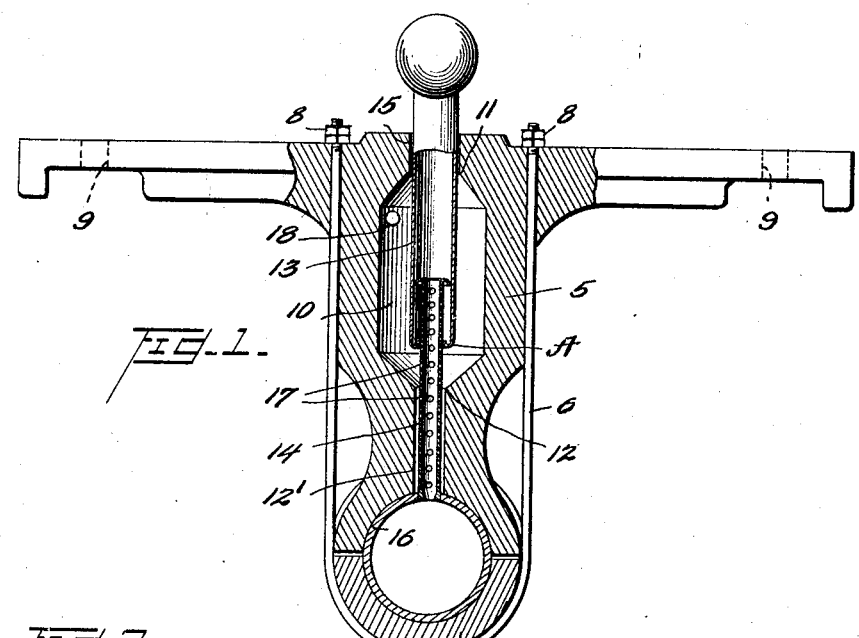
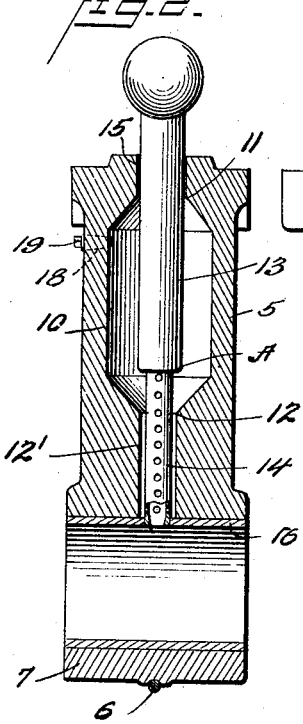
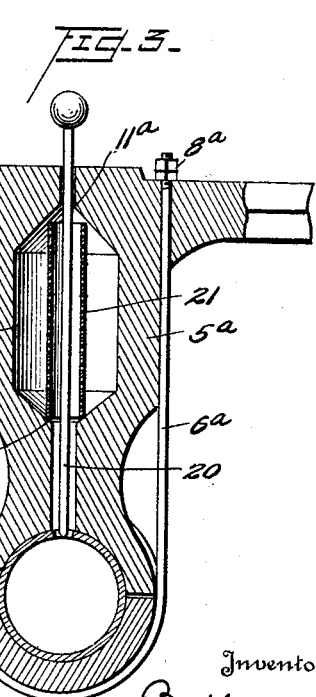
Inventor
J. Oswell Bailey
By Alwood, Crowe & Gordon
Attorneys Patented Dec. 10, 1929

1,739,345

UNITED STATES PATENT OFFICE

JOSEPH OSWELL BAILEY, OF ATLANTA, GEORGIA

LUBRICATING CONVEYER HANGER

Application filed March 29, 1928. Serial No. 265,595.

Broadly this invention relates to a lubricating device, but it is more especially directed to the type employed in connection with the lubrication of hangers and similar forms of bearings.

An important object of this invention is the provision of a device of this character mounted within the hanger and adapted to automatically effect lubrication of the bearing.

A further important object is the provision of a device of this character located within the hanger and comprising an oil or grease reservoir, said reservoir being provided with a tube or thermal rod having its lower extremity gravitationally contacting the coupling to be lubricated, whereby such frictional contact will effect a sufficient heating of the tube or rod to render the lubricant of such consistency as to be gradually released to effect continuous lubrication of the coupling at all times commensurate with operating requirements.

Another important object of this invention is the provision of a lubricating device of this character positioned in the hanger, comprising a telscopic tube with its lower extremity resting on the coupling by weight of gravity, the lower portion of said tube being formed with a plurality of perforations, so that as the tube becomes heated by frictional contact with the coupling the grease or oil will be sufficiently heated to escape through said perforations and thereby effect continuous lubrication of said coupling commensurate with operating requirements.

A further object of this invention is the provision of a device of this character having a lubricant reservoir formed with a telescopic perforated tube frictionally contacting the coupling to sufficiently heat the lubricant to insure at all times the lubrication of the coupling, such telescopic arrangement compensating for the frictional wear of the lower end of such tube and rendering replacement unnecessary over a long period of time.

With these and other objects in view, which will become apparent as the description proceeds, the invention resides in the construction, combination and arrangement of parts hereinafter more fully described and claimed, and illustrated in the accompanying drawings, in which like characters of reference indicate like parts throughout the several figures, of which:

Fig. 1 is a longitudinal section through a hanger and my improved device operatively positioned therein;

Fig. 2 is a transverse central section of Fig. 1; and

Fig. 3 is a vertical sectional view of a slightly modified form of device.

The lubricating devices with which I am familiar have proven unsatisfactory by reason of the frequency with which they have to be refilled or owing to their construction often failing to properly function by reason of the lubricant becoming congested and failing to flow to the bearing, and for other reasons unsatisfactory, and it was to overcome such deficiencies and to provide a lubricating device preferably adapted to be positioned within the hanger and comprising a lubricant reservoir formed with a telescopic outlet tube frictionally contacting the coupling by weight of gravity, perforated at its lower extremity so that such frictional contact during operation of the device would sufficiently heat the lubricant as to cause it to continuously flow to the surfaces to be lubricated over a long period of time without necessitating refilling of the device, the said outlet tube adapted to function substantially during the life of the hanger irrespective of its frictional wear, but which may be expeditiously removed at any time to more easily fill the device, or for other purposes, that I designed the device forming the subject matter of this invention.

In the illustrated embodiment characterizing this invention there is shown a hanger 5, in the present instance, representing a conveyor hanger of the T-shaped split bearing type provided with a U-bolt or steel strip 6 extending around the lower extremity of bearing section 7 of the hanger with its free ends projecting upwardly through said hanger and secured by adjusting and locking nuts 8, the free extremities of the T portion of the hanger being perforated as at 9 to receive bolts or other securing elements (not shown).

A lubricant reservoir 10 is vertically positioned in the hanger adjacent its upper edge and suitably secured therein, or the reservoir may be integrally cast with the hanger if desired. The reservoir is formed with upper and lower vertically aligned openings 11 and 12, respectively, adapted to receive the telescopic tube A comprising sections 13 and 14, respectively. The section 13 having its upper end extending through the opening 15 in the hanger 5 and above the surface thereof, and having its lower end projecting within the reservoir 10 to a point spaced from the bottom thereof, and frictionally mounted within said tube is a telescopic section 14 which extends through opening 12 and vertical bore 12′ of slightly larger diameter than said section, and seats by weight of gravity on a bearing or coupling element 16, for a purpose which will hereinafter more fully appear. The section 14 is formed with a plurality of small apertures 17 for a purpose hereinafter explained.

In order to fill the reservoir 10 without the removal of any of the parts, perforations 18 are formed in the hanger 5 extending through and into the reservoir 10 which are normally closed by threaded plugs 19, or where the type of lubricant renders it more desirable, the entire telescopic tube A comprising the sections 13 and 14 may be withdrawn to admit of the expeditious filling of the reservoir through the top of the hanger. Also it will be noted that the reservoir 10 is tapered at its lower end to more effectually deliver the lubricant to the section 14, and while I am not limiting myself to any particular configuration of reservoir, in the present instance, for the sake of uniformity the top is shown as tapered similar to the lower portion of the reservoir.

A slightly modified form of lubricating device is illustrated in Fig. 3 of the drawing showing a hanger 5ª, U-bolt or steel strip 6ª supporting the lower bearing section 7ª and secured by nuts 8ª, said hanger having perforations 9ª and formed with reservoir 10ª, said reservoir being substantially similar to reservoir 10 hereinbefore described. The hanger is formed with a central inlet bore 11ª and outlet bore 12ª, the latter adapted to effect communication between the reservoir 10ª and coupling bearing 16ª. A tube or thermal rod 20 is adapted to extend through said bores and gravitationally rest on the coupling. A perforated, preferably copper, strainer tube 21 is mounted in reservoir 10ª through which is adapted to extend the rod 20, and as the said rod or tube becomes heated by frictional contact with the conveyer coupling, the nonfluid grease packed in the reservoir surrounding the strainer tube 21 is automatically released through said perforations in such amount only as necessary to continuously lubricate the bearing commensurate with operating requirements, similar to the form hereinbefore described, as will be apparent without further description.

While I have preferably designated the lubricant as a nonfluid grease, it will be understood that under certain circumstances it might be advisable to substitute therefor an oil or different type of lubricant.

It will be observed that I have designed a lubricating device or what might be termed a lubricating conveyer hanger comprising a grease reservoir to insure the conveyer coupling being supplied with oil which is released to said coupling gradually and in such quantities as to keep the bearing well lubricated at all times, and which I have accomplished by means of a tube A which may be in one section, but preferably comprising telescopic sections 13 and 14 and though this tube may be formed of any heat conducting material, practice has demonstrated copper to be preferable. The said section 14 has its upper end telescopically mounted in the section 13 and its lower end by gravity resting on the coupling, and as it becomes warm through such frictional contact the oil in the reservoir 10 will melt sufficiently to filter or strain through the very fine perforations 17 therein and be directed to the bearing, and by virtue of which, lubrication of said bearing will be effected at all times.

I desire to further emphasize that the frictional wear of the telescopic section 17 is infinitesimal over a long period and that the compensating telescopic adjustment is such that this tube would not have to be replaced probably during the life of the hanger, and also, that when the device has been once properly filled or packed with the desired lubricant it will automatically function for possibly a year without necessitating refilling.

While I have preferably shown my device as operating to melt the lubricant and discharge it through the fine perforations to the bearing, yet should the oil or lubricant become congealed or hardened the tube 14 will operate with equal facility to melt the lubricant surrounding said tube and filter same through the perforations to be discharged to the bearing through the central bore of the tube, or around the tube through the bore 12′ as may be understood without further description.

From the above it will be apparent that I have designed a lubricating device which may be secured exterior of some types of hangers but which I have preferably shown as mounted interior thereof, adapted to automatically effect a continuous lubrication of the bearing over a long period without the necessity of frequent replacement of parts; one simple in construction, manufacturable at a negligible cost, easily installed, susceptible of being expeditiously filled and refilled and capable of withstanding continued usage substantially throughout the life of the hanger, and yet efficient for the purposes intended.

Although in practice I have found that the form of my invention illustrated in the accompanying drawings and referred to in the above description as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claim without departing from or sacrificing any of the principles of this invention.

Having thus described my invention, what I desire protected by Letters Patent is as set forth in the following claim:

A hanger having a bearing in which is mounted a coupling, of a lubricant reservoir carried by the hanger having upper and lower aligned openings, a tube adapted to extend through said openings, said tube comprising upper and lower telescopic sections, the upper section projecting above said hanger and extending partially within said reservoir, the lower section extending through said lower opening of sufficient diameter to provide a channel surrounding said section, the upper end of said section being telescopically engaged within the upper section, co-acting means carried by the contacting ends of said sections to prevent their normal disengagement and allow their removal as a unit from said hanger, said lower section being perforated throughout its length and adapted to gravitationally contact said coupling to effect heating thereof, whereby the lubricant above and within the lower opening is directed exteriorly of said lower section and through said perforations interiorly thereof to the coupling, irrespective of the normal consistency of the lubricant.

JOSEPH OSWELL BAILEY.